(12) United States Patent
Schwarz

(10) Patent No.: US 10,083,429 B2
(45) Date of Patent: Sep. 25, 2018

(54) TASK-BASED PAYMENT FOR CONTENT

(71) Applicant: Nagravision S.A., Cheseaux-sur-Lausanne (CH)

(72) Inventor: Christian Schwarz, Vuarrens (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 1024 days.

(21) Appl. No.: 14/469,485

(22) Filed: Aug. 26, 2014

(65) Prior Publication Data
US 2016/0063465 A1 Mar. 3, 2016

(51) Int. Cl.
| | |
|---|---|
| *G06Q 30/00* | (2012.01) |
| *G06Q 20/12* | (2012.01) |
| *G06Q 10/00* | (2012.01) |
| *G06Q 20/02* | (2012.01) |
| *G06Q 20/08* | (2012.01) |
| *G06Q 20/22* | (2012.01) |
| *G06Q 30/02* | (2012.01) |
| *H04L 12/911* | (2013.01) |
| *H04L 29/06* | (2006.01) |
| *H04L 29/08* | (2006.01) |

(52) U.S. Cl.
CPC .......... *G06Q 20/127* (2013.01); *G06Q 10/00* (2013.01); *G06Q 20/02* (2013.01); *G06Q 20/08* (2013.01); *G06Q 20/1235* (2013.01); *G06Q 20/22* (2013.01); *G06Q 30/0232* (2013.01); *H04L 47/745* (2013.01); *H04L 65/60* (2013.01); *H04L 67/143* (2013.01)

(58) Field of Classification Search
USPC .................................................. 705/14, 319
See application file for complete search history.

(56) References Cited

U.S. PATENT DOCUMENTS

| | | | |
|---|---|---|---|
| 2007/0282893 A1* | 12/2007 | Smith ............... | G06F 17/30058 |
| 2008/0168516 A1* | 7/2008 | Flick ................ | H04N 21/23106 |
| | | | 725/112 |
| 2009/0228920 A1 | 9/2009 | Tom et al. | |
| 2012/0304223 A1 | 11/2012 | Sargent et al. | |
| 2013/0218753 A1 | 8/2013 | Oikonomidis | |
| 2015/0019964 A1* | 1/2015 | Campbell ........... | H04L 65/4092 |
| | | | 715/716 |

OTHER PUBLICATIONS

Wang, Face Recognition Search Engine that Uses Distributed Computing-based ASM, Nov. 2013, Shanghai Jiao Tong University.*
Zango, Search Assistant, Mar. 2008.*
(Continued)

*Primary Examiner* — Matthew T Sittner
*Assistant Examiner* — Richard G Reinhardt
(74) *Attorney, Agent, or Firm* — Schwegman Lundberg & Woessner, P.A.

(57) ABSTRACT

Methods and systems of paying for content, such as, for example, audio and/or video content, are presented. In an example method, a task to be executed using at least one device resource associated with a user device is provided. Also, the task is to be executed during streaming of a content item. The streaming of the content item to the user device is caused to terminate in response to a determination that the execution of the task using the at least one device resource has been terminated.

19 Claims, 7 Drawing Sheets

(56) References Cited

OTHER PUBLICATIONS

Wang, Face Recognition Search Engine that Uses Distributed Computing-based ASM, Nov. 2013, Shanghai Jiao Tong University (Year: 2013).*
Zango, Search Assistant, Mar. 2008 (Year: 2008).*
STIC Search Results (Year: 2018).*
"International Application Serial No. PCT/EP2015/069347, International Search Report dated Oct. 26, 2015", 3 pgs.
"International Application Serial No. PCT/EP2015/069347, Written Opinion dated Oct. 26, 2015", 7 pgs.

* cited by examiner

TASK-BASED PAYMENT FOR CONTENT

FIELD

This application relates generally to the field of electronic communications and, in an example embodiment, to tasked-based payment for content.

BACKGROUND

While much content, such as, for example, audio content, video content, audio/video content, still image content, textual content, and the like, is free to all potential viewers via the Internet and other wide area networks (WANs), a significant amount of content, including copyrighted movies, television shows, news programs, and so on, is often accessible only in return for some type of compensation. In many examples, such compensation takes the form of a monetary payment from the viewer to a provider of the content. In other cases, the viewer may agree to viewing or consuming the content in a degraded form that somehow provides a benefit to the provider. For example, the viewer may agree to one or inure advertisements being presented to the viewer in conjunction with the content, such as in a corner or other location of a display while the content is being presented to the viewer on the same display. In other examples, the provider may interrupt presentation of the content to the viewer one or more times and insert advertisements within the temporal interstices of the content created by the interruptions.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of the embodiments disclosed herein. It will be evident, however, to one skilled in the art that the embodiments may be practiced without these specific details.

Figure 1:
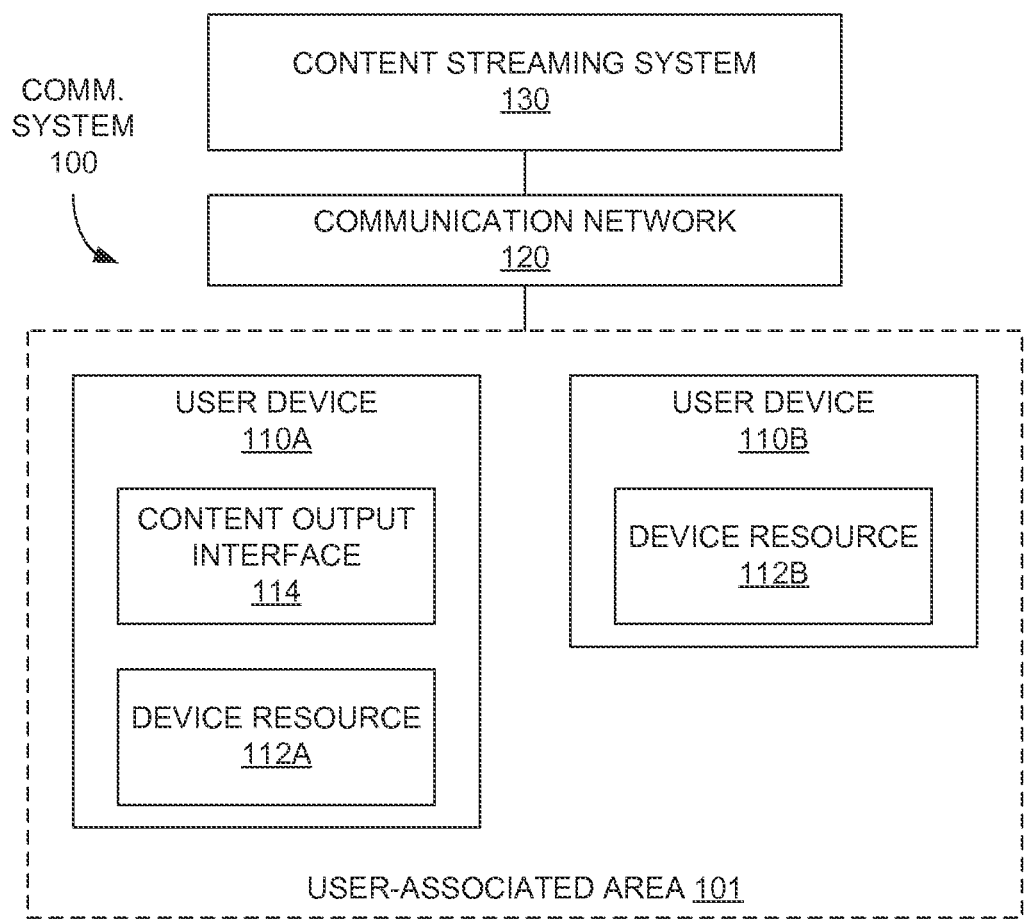
FIG. 1 is a block diagram of an example communication system employable for facilitating task-based payment for content.

FIG. 1 is a block diagram of an example communication system 100 employable for facilitating task-based payment for content. In the communication system 100, a content streaming system 130 may stream or otherwise deliver content via a communication network 120 to a use-associated area 101 having one or more user devices 110A and 110B (collectively, one or more user devices 110). An example of the content streaming system 130 is discussed in greater detail in connection with FIG. 3. The content may be any kind of content that is streamed or otherwise delivered over time via the communication network 120 to one or more user devices 110 at the user-associated area 101. Examples of the content may include, but are not limited to, video content, audio content, audio/video content, still image content, graphical content, and textual content.

The communication network 120 may include any type of network that facilitates communication between the content streaming system 130 and the user-associated area 101, including, but not limited to, a wide area network (WAN) (e.g., the Internet), a local area network (LAN), a cellular telephone network (e.g., a third-generation (3G) or fourth-generation (4G) network), or any other wired and/or wireless network configured for such communications.

Other user-associated areas not specifically depicted in FIG. 1 may also receive the same or different content from the content streaming system 130 via the communication network 120, but only one user-associated area 101 is discussed herein to simplify and focus the following discussion. Examples of the user-associated area 101 may include, but are not limited to, a home, a business office, a retail establishment, a restaurant, a bar, a sports arena, a stadium, or any other area within which a user device may operate. Within the user-associated area 101, the one or more user devices 110 may communicate with the content streaming system 130 via a communication gateway (e.g., a cable modulator/demodulate (modem) or a digital subscriber line (DSL) modem) located within the user-associated area 101. In other examples, the user devices 110 may communicate with the communication network 120 via one or more devices located external to the user-associated area 101.

The user device 110 may be any device capable of receiving, storing, displaying, and/or presenting content. Examples of the user device 110 may include, but are not limited to, a media gateway, a network router, a television set-top box, a television, a gaming system, a streaming device (e.g., a Roku®), a desktop computer, a laptop computer, a tablet computer, a smart phone, and a personal digital assistant (PDA). The user device 110 may communicate with other user devices 110 within the user-associated area 101, such as by way of a wired and/or wireless LAN (e.g., Ethernet, Wi-Fi®, and the like), as well as with the content streaming system 130 via the communication network 120.

In the example of FIG. 1, a first user device 110A includes at least a content output interface 114 and a device resource 112A. Other components of the user device 110A, as well as components of other devices discussed hereinafter, are not illustrated or discussed herein to simplify and focus the following discussion. The content output interface 114 (e.g., a visual display, an audio output, and/or the like) may be configured to present content received from the content streaming system 130 via the communication network 120 to a user of the user device 110A. The device resource 112A may be any resource, such as a computational resource or unit (e.g., a central processing unit (CPU) and/or a graphical processing unit (GPU)), a communication resource or unit (e.g., a communication interface and/or a communication data buffer), or any other resource of benefit to a producer, distributor, owner, licensee, or other entity associated with the content. In the embodiments described herein, the device resource 112A may be used to perform at least one task for the benefit of the content streaming system 130 or another entity in exchange (e.g., as payment) for the content streamed from the content streaming system 130 to the user device 110A. In other examples, a second user device 110B associated with the user device 110A may include a device resource 112B that may be employed to perform the task, or a portion thereof, in addition to, or in lieu of, the device resource 112A of the first user device 110A. In yet other embodiments, one or more additional user devices 110 located within, or external to, the user-associated area 101, may be employed to present the content to a user and/or perform the task. While two user devices 110A, 110B are depicted in FIG. 1, any one or more user devices 110 may be employed within the user-associated area 101 in other embodiments.

Figure 2:
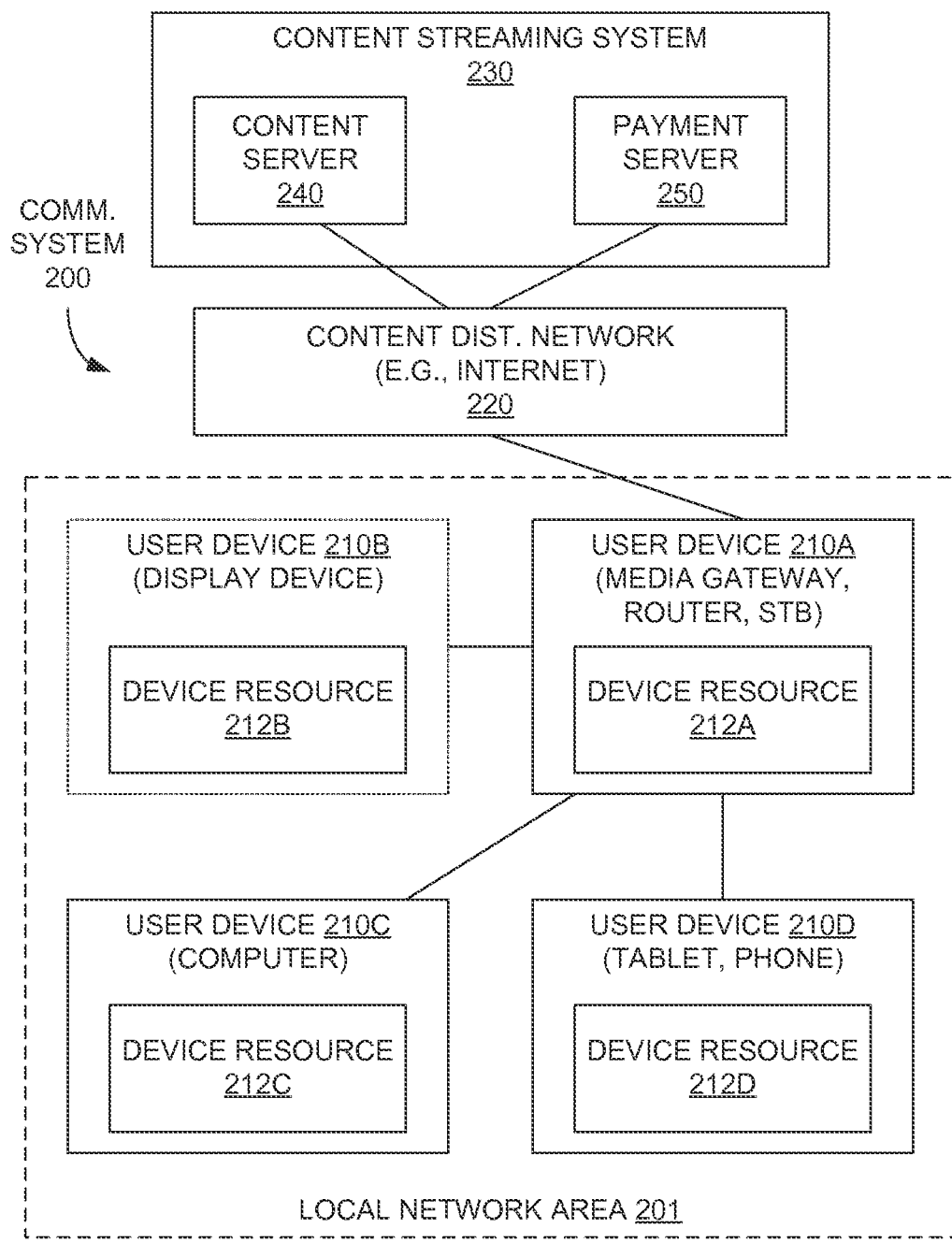
FIG. 2 is a block diagram of another example communication system employable for facilitating task-based payment for content.

FIG. 2 is a block diagram of another example communication system 200 employable for facilitating task-based payment for content. In this example, a content streaming system 230 for streaming content to one or more user devices 210A, 210B, 210C, and 210D (collectively, user devices 210) may include a content server 240 and a payment server 250. In this example, the content server 240 may be configured to access content of interest to a user of a user device 210 and deliver (e.g., stream) the content to user device 210 in exchange for the user providing one or more device resources 212A, 212B, 212C, and 212D (collectively, one or more device resources 212) to perform one or more tasks of some benefit to an entity (e.g., producer, distributor, owner, and/or licensee). The payment server 250 may be configured to provide the one or more tasks to be performed to the one or more user devices 210 and monitor progress of the performance of the one or more tasks. An example of the content server 240 and the payment server 250 is discussed below in conjunction with FIG. 3. The content server 240 and the payment server 250 may be co-located at a particular geographic location, or may be situated at different geographic locations.

The local network area 201 may be a wired (e.g., Ethernet) and/or wireless (e.g., Wi-Fi®) network by which one or more of the user devices 210 may communicate with either or both the content streaming system 230 and the payment server 250 via a content distribution network (e.g., the Internet), as well as with other user devices 210. As shown in the particular example of FIG. 2, the user devices 210 may include a user device 210A serving as a media gateway, a router, a set-top box, or the like, and including a device resource 212A; a second user device 210B serving as a display device (e.g., a television or a monitor) and including a device resource 212B; a third user device 210C (e.g., a desktop or laptop computer) and including a device resource 212C; and a fourth user device 210D (e.g., a tablet computer or smart phone) and including a device resource 212D. In this example, the user devices 210B, 210C, and 210D may present the content to a user and may communicate with the content streaming system 230 via the content distribution network 220 and the first user device 210A. Any of the user devices 210 may provide its device resource 212 for executing one or more tasks as payment for the content.

Figure 3:
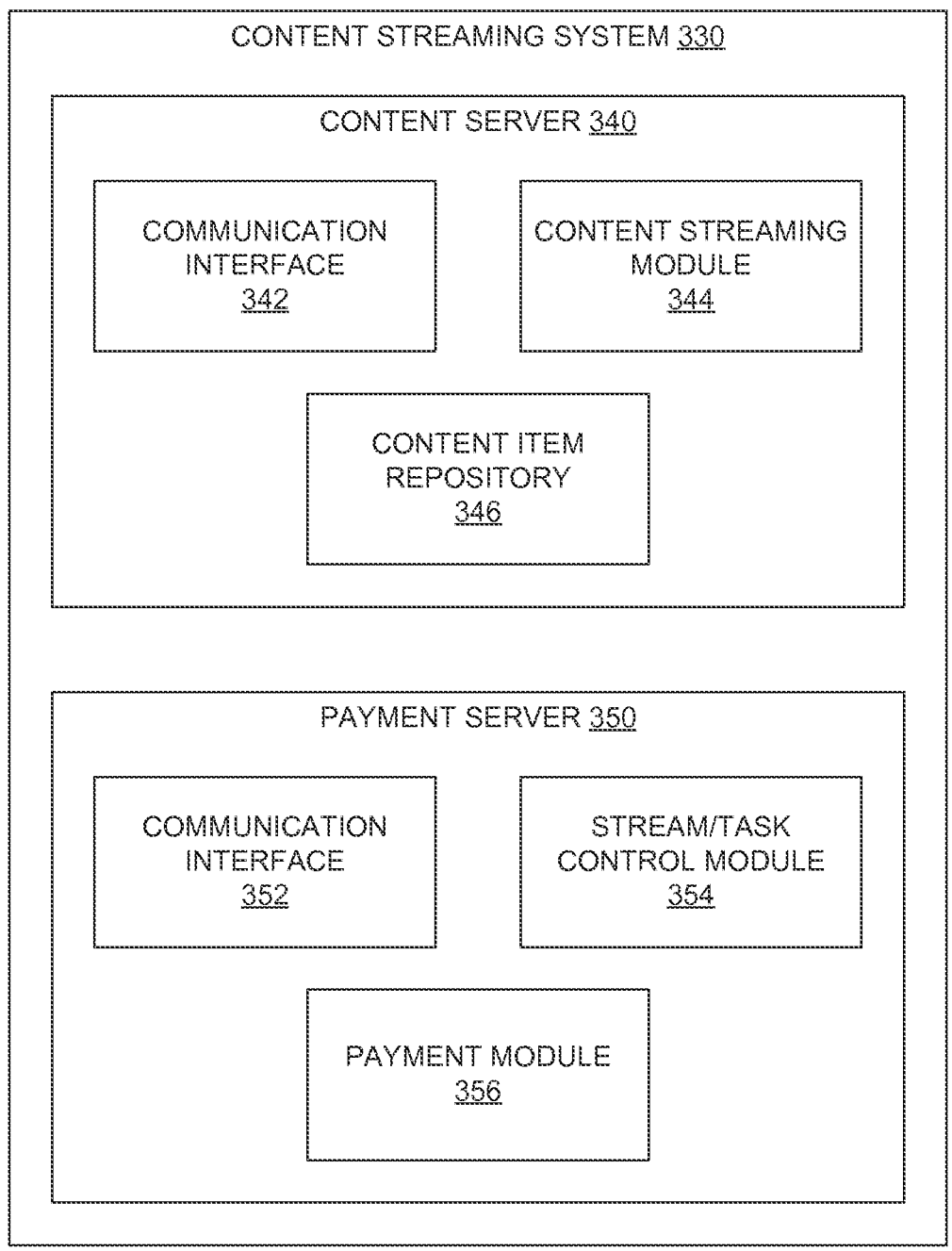
FIG. 3 is a block diagram of an example content streaming system employable in the example communication systems of FIGS. 1 and 2.

FIG. 3 is a block diagram of an example content streaming system 330 employable in the example communication systems 100 and 200 of FIGS. 1 and 2, respectively, as, for example, the content streaming system 130 of FIG. 1 and the content streaming system 230 of FIG. 2. As shown in FIG. 3, the content streaming system 330 may include a content server 340 and a payment server 350, which may serve in some examples as the content server 240 and the payment server 250 of FIG. 2, respectively. The content server 340 may include a communication interface 342, a content streaming module 344, and a content item repository 346, while the payment server 350 may include a communication interface 352, a stream/task control module 354, and a payment module 356. Each of the modules of the content server 340 and the payment server 350, as well as other modules described herein, may include hardware, software, or some combination thereof for performing the various functions corresponding to the module, as is described more fully below. Other possible components, such as, for example, a user interface, may be included in the content streaming system 330, but are not explicitly illustrated in FIG. 3 to simplify the following discussion. Additionally, not all components depicted in FIG. 3 and other drawings may be included in all embodiments. Further, components shown in FIG. 3 and other block diagrams herein may be further divided into separate components, or may be combined to create fewer, larger components.

In the content server 340, the communication interface 342 may be configured to facilitate communications between the content server 340 and the payment server 350 via a communication network (e.g., communication network 120 of FIG. 1 or content distribution network 220 of FIG. 2). Such communications may include, for example, authorization messages received from the payment server 350 to transmit content, or portions thereof, to a user device (e.g. user device 110 of FIG. 1 or user device 210 of FIG. 2). The communication interface 342 may also be configured to transfer the authorized content to the user device 110, 210 via the communication network 120 or the content distribution network 220.

The content streaming module 344 may be configured to stream or otherwise transfer content to the user device 110, 210 via the communication interface 342. In some examples, the content streaming module 344 may transfer a portion, block, or "chunk" of content to a user device 110, 210 each time the content streaming module 344 receives an authorization from the payment server 350 to do so. Also, the content streaming module 344 may detect situations in which the user device 110, 210 has terminated reception of the content.

The content item repository 346 may be configured to store or provide the content being streamed by the content streaming module 344. In FIG. 3, the content item repository 346 is shown as residing within the content server 340. In other examples, the content item repository 346 is located external to the content server 340, such as in a separate server, database, or storage system that may be accessed via the communication network employed by the communication interface 342, or via another network or communication connection.

In the payment server 350, the communication interface 352 may be configured to facilitate communications between the payment server 350 and the content server 340 via a communication network (e.g., communication network 120 of FIG. 1 or content distribution network 220 of FIG. 2). Such communications may include, for example, authorization messages transmitted to the content server 310 to transmit content, or portions thereof, to a user device (e.g., user device 110 of FIG. 1 or user device 210 of FIG. 2). The communication interface 352 may also be configured to transfer information to the user device 110, 210 via the communication network 120 or the content distribution network 220 to cause the user device 110, 210, or another device associated therewith, to perform one or more tasks or subtasks as payment for content. Further, the communication interface 352 may be configured to receive an indication from a user device 110, 210 that one or more tasks or subtasks have been completed. In one example, such an indication may include a result of the one or more tasks or subtasks.

The stream/task control module 354 may be configured to monitor completion of tasks or subtasks performed by the user device 110, 210. For example, the stream/task control module 354 may transfer messages via the communication interface 352 to cause the user device 110, 210, or another user device corresponding thereto, to perform the tasks or subtasks and, in response to the user device 110, 210 completing each task or subtask, to receive indications that the tasks or subtasks have been performed completely or successfully. Further, in response to those indications, the stream/task control module 354 may send authorizations via the communication interface 352 to the content server 340 to stream or deliver content, or some portion thereof, to the user device 110, 210.

Each task or subtask to be completed by the user device 110, 210 may be any task of benefit to some entity associated with the content, such as a content owner, distributor, retailer, licensee, or the like. Examples of a task or subtask may include, but are not limited, computations for "mining" of digital currency (e.g., Bitcoin™), computations for a facial recognition algorithm, computations for a deoxyribonucleic acid (DNA) folding algorithm, and retransmission of communications to one or more communication devices other than the user device 110, 210, and so on. Many other examples, such as distributed computing or processing examples, are also possible tasks or subtasks to be completed by a user device 110, 210. Computations for mining of digital currency may be viewed as a direct payment, as the results of such tasks or subtasks may be viewed as directly representing a monetary value, while other tasks or subtasks may have some monetary value attached to them by the payment server 350.

The payment module 356 may be configured to select one or more tasks to perform for the content to be presented to the user of a user device 110, 210. In one example, the payment module 356 may assign a particular value (e.g., a monetary value) to each task that is available for performance by one or more user device resources 112, 212. The payment module 356 may also assign a value, such as a monetary value, to the content to be streamed or delivered to the user device 110, 210. The payment module 356, based on the value assignments to the tasks and the content, may select one or more of the tasks to be performed in exchange for receiving the content. Further, the payment module 356 may divide the one or more selected tasks into subtasks, as well as divide the content into corresponding portions or "chunks." The payment module 356 may forward indications of these subtasks and content portions to the stream/task control module 354, described above. As a result, the performance of a particular subtask may allow the user device 110, 210 to receive, store, and/or consume a corresponding portion of the content. Accordingly, termination of the performance of one or more subtasks by the user device 110, 210 providing the task-performing device resource 112, 212 may result in the stream/task control module 354 terminating the streaming or delivery of the content. Also, termination of the content streaming or delivery by the user device 110, 210 presenting the content may cause the stream/task control module 354 to cease providing the remaining subtasks associated with the content.

Figure 4:
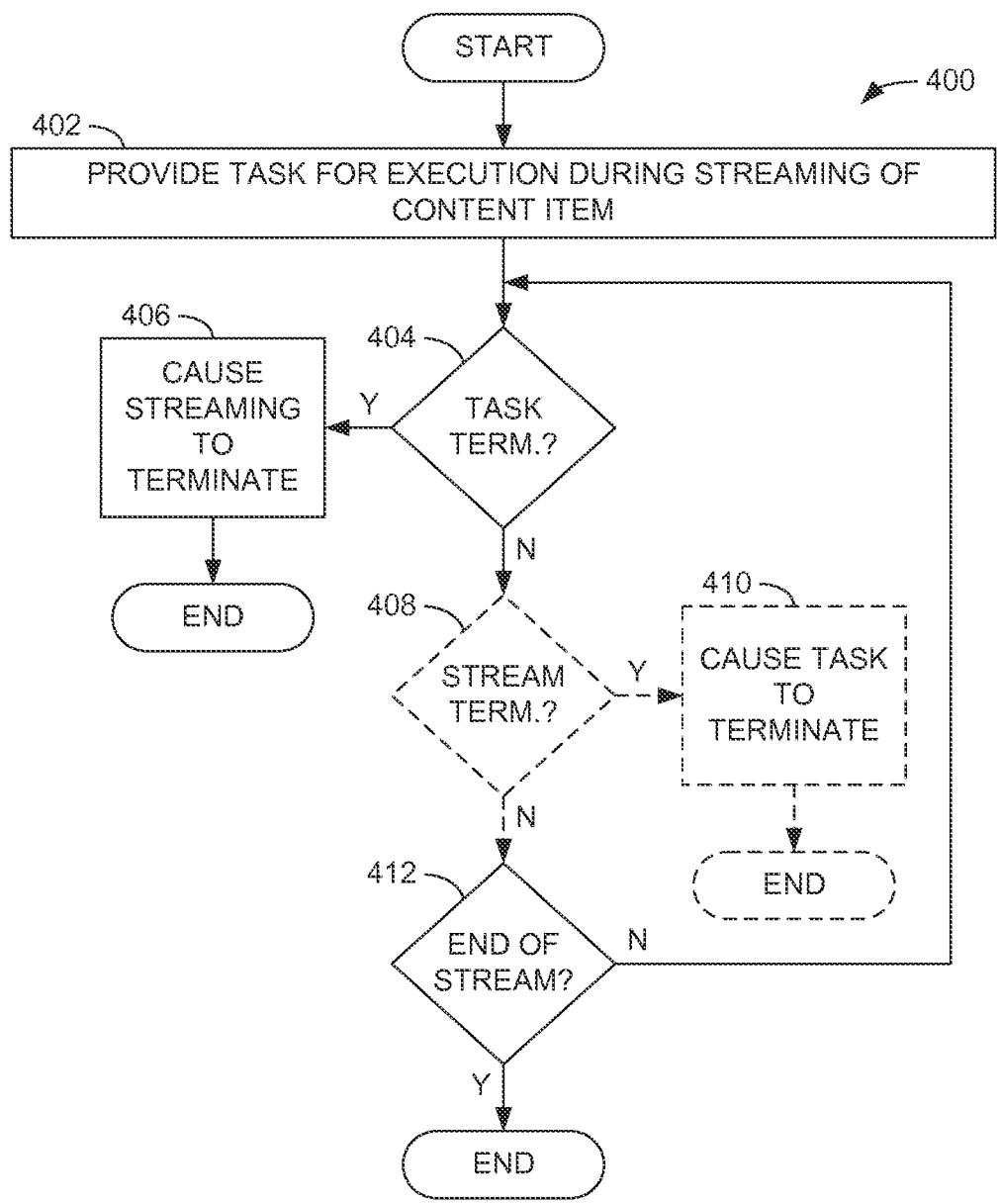
FIG. 4 is a flow diagram of an example method of facilitating task-based payment for content.

FIG. 4 is a flow diagram of an example method 400 of facilitating task-based payment for content. In at least some examples, the method 400 may be performed using the content streaming systems 130, 230 in the communication systems 100, 200 of FIGS. 1 and 2. Further, one possible embodiment of a content streaming system configured to perform the method 400 may be the content streaming system 300 of FIG. 3. However, other devices or components not specifically described herein may perform the operations of the method 400 in other embodiments.

In the method 400, a content streaming system 130, 230 may provide one or more tasks to a user device 110, 210 for performance by a device resource 112, 212 supplied by the user device 110, 210 or another associated device (operation 402). The one or more tasks are performed as payment for receiving, storing, and/or consuming content, as described in greater detail above. As discussed above, the one or more tasks may be divided into a number of subtasks, each of which corresponds to a portion of the content. Consequently, the provision and performance of the one or more tasks may progress while the content is being streamed or otherwise transferred to the user device 110, 210, thus creating a task-based "pay as you go" arrangement in which the user device 110, 210 may cease performance of the one or more tasks while the content is being streamed to the user device 110, 210, thus paying only for the amount that has been received or consumed thus far. In some examples, the user device 110, 210 may instead cease reception of the content prematurely, thus causing the remainder of the one or more tasks to remain undelivered to the user device 110, 210.

More specifically, while the one or more tasks are being provided during the streaming of the content, the content streaming system 130, 230 may determine whether the user device 110, 210 has ceased performance of the one or more tasks (operation 404). If so, the content streaming system 130, 230 may terminate the streaming of the content to the user device 110, 210 (operation 406). In some examples, the content streaming system 130, 230 may also determine whether the reception of the content being streamed has been terminated (operation 108). If so, the content streaming system 130, 230 may also terminate the provision of the tasks to the user device 110, 210 (operation 410). Otherwise, if the end of the content stream has not been encountered (operation 412), the content streaming system 130, 230 may continue to stream the content and provide the one or more tasks to the user device 110, 210 (or to some user device associated therewith) while determining whether the user device 110, 210 has terminated performance of the one or more tasks, or even whether the user device 110, 210 has caused the streaming of the content to cease prematurely.

While the operations 402 through 412 of FIG. 4 are shown as occurring in a specific order, other orders of operation, including concurrent execution of two or more operations, are also possible. In one example, the determination of whether the performance of the one or more tasks has been terminated prematurely at the user device 110, 210 (operation 404) and the determination of whether the reception of the content stream has been terminated prematurely at the user device 110, 210 (operation 408) may be performed in any order, and may be performed periodically, continually, or in some other repetitive manner, possibly in a parallel, simultaneous, or concurrent fashion.

Figure 5:
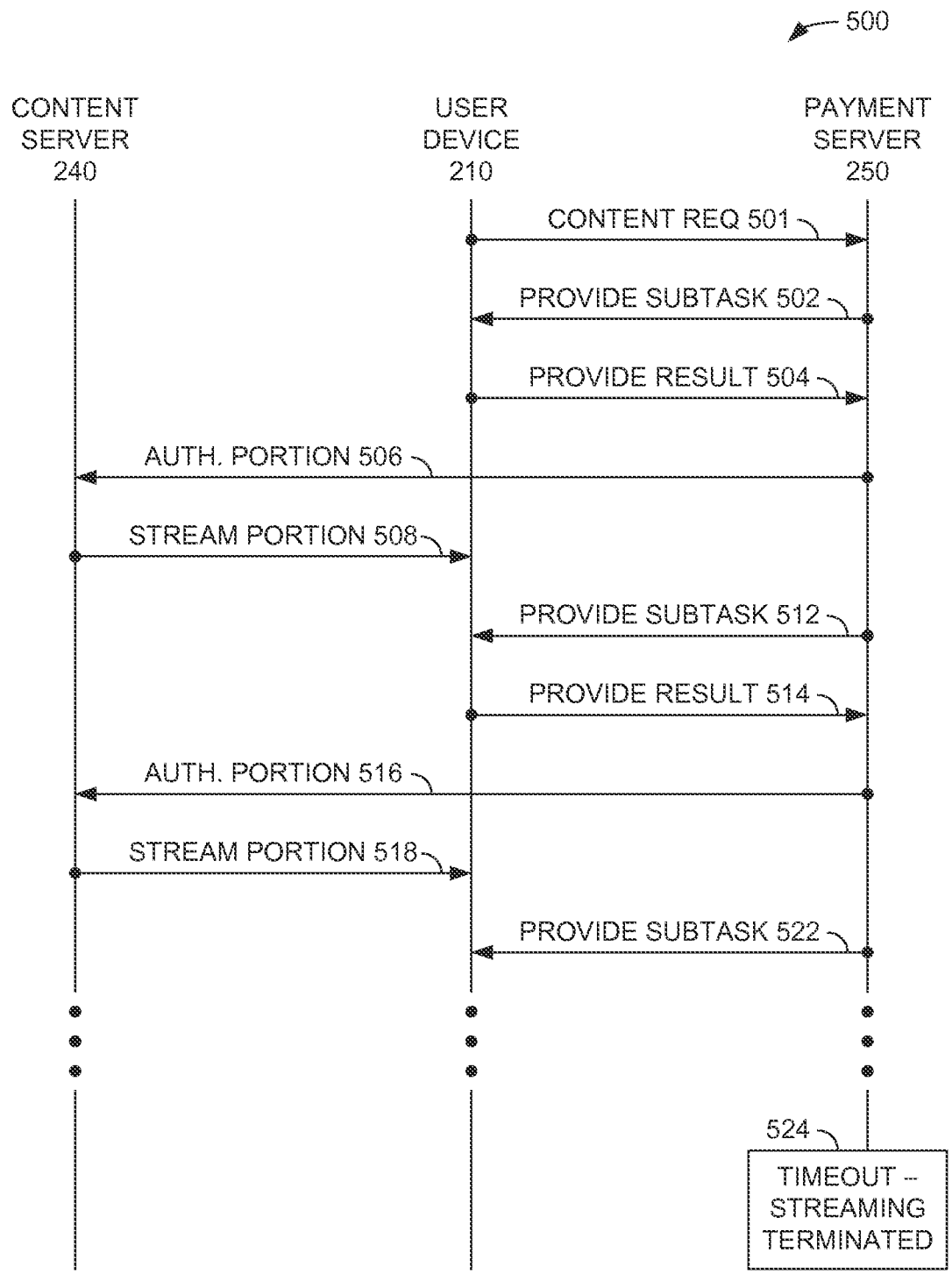
FIG. 5 is a communication diagram of an example in which performance of a task is prematurely terminated at a user device.

FIG. 5 is a communication diagram 500 of an example in which performance of one or more tasks associated with content being streamed or otherwise delivered to a user device 210 is prematurely terminated at the user device 210. In both the examples of FIG. 5 and FIG. 6, the use of the communication system 200 of FIG. 2 is presumed. However, other communication systems other than communication system 200 may be utilized in a similar manner.

As shown in FIG. 5, a user device 210 nay transmit a content request message 501 to the payment server 250. In one example, the content request message 501 may indicate a particular item or items of content, such as a movie, a television program, a song or album of songs, or the like. In some embodiments, the content request message 501 may also indicate a particular type of task to which the user of the user device 210 is willing to dedicate one or more resources 212. Such an indication may be selected from a plurality of different task types provided by the payment server 250, such as selections provided via a web page or native application accessible via the user device 210, In response to the content request message 501, the payment server 250, based on any additional information regarding a type of task that the user may have chosen, may select a particular task, divide the selected task into multiple subtasks, and then transmit a message 502 to provide a first subtask of the multiple subtasks to the user device 210 for execution or performance. In some embodiments, the payment server 250 may also divide the content into corresponding portions or chunks and inform the content server 240 of those divisions, as described above.

In one example, providing the subtask may include transmitting a message to the user device 210 that includes at least an indication of the particular subtask to be performed, possibly along with any input information to be utilized by executable programming or code to perform the subtask. In some embodiment, the message may also provide the executable programming or code (e.g., an application or applet) to perform the subtask. In other examples, such executable code may be transmitted once prior to the performance of any of the subtasks that constitute the one or more tasks to be performed in exchange for the content. In that case, the provision would then include the input information to be utilized by the executable code. In yet other examples, the executable code may be provided in anticipation of future content requests received from the user device 210. In some embodiments, the executable code may be Java® code.

In response to the first subtask, the user device 210 may send a message 504 indicating a result (e.g., an indication of a successful or unsuccessful result and/or a Boolean, numerical, or textual result) of the subtask performed. In one example, the user device 210 may perform the entirety of the subtask. In other examples, the user device 210 may forward at least a portion of the subtask to another user device 210, such as a user device within the local network area 201. In one particular example, the user device 210A (e.g., a media gateway, router, and/or set-top box) may forward at least a portion of the subtask to another user device 210C (e.g., a desktop or laptop computer) while forwarding the portion of the content that corresponds to the subtask to another user device 210B, 210C (e.g., a television, a tablet computer, or a smart phone) for presentation to the user. Many other examples of user devices 210 which may receive the subtask, forward the content presentation, and/or forward the subtask for performance, are also possible.

In response to receiving the message 504 returning the subtask result, the payment server 250 may transmit a message 506 authorizing the content server 240 to transmit or stream the corresponding portion or chunk of the content to the user device 210. In response, the content server 240 may then transmit the corresponding portion or chunk 508 of the content to the user device 210. Depending on the particular example, the user device 210 may then present that portion of the content to the user or forward that portion of the content to another user device 210 for presentation to the user, as mentioned above.

The communication among the payment server 250, the content server 240, and the user device 210 may proceed in a similar manner for subsequent subtasks, with the payment server 250 providing a subtask (message 512), the user device 210 providing a corresponding result (message 514), the payment server 250 authorizing the corresponding content chunk (message 516) in response to the result, and the content server 240 streaming the portion or chunk 518 in response to the authorization, possibly while a message 522 indicating another subtask is transferred from the payment server 250 to the user device 210. While the communication diagram 500 displays the various transmissions or messages 501-522 as occurring in a particular order, some overlap between communications may occur. For example, a current portion or chunk of the stream may continue to be streamed while the payment server 250 provides the next subtask to the user device 210. The providing of the result and the authorization of the corresponding content portion may also occur while the previous content portion is being streamed to promote actual or virtual continuous streaming of the content to the user device 210. In some examples, two or more subsequent content portions may be authorized while the content server 240 is streaming or otherwise delivering the current content portion to the user device 210.

In some examples, more than one subtask may be provided to the user device 210 at a time (e.g., using one message or transmission from the payment server 250 to the user device 210). In response, the user device 210 may return individual messages 504 indicating one or more results for each subtask, resulting in multiple responses or messages 504 for a single provision message 502 of multiple subtasks. Oppositely, the user device 210 may provide results for multiple subtasks within a single message 504 or transmission to the payment server 250. Further, the payment server 250 may provide authorization for the streaming of multiple content portions or chunks 508 within a single message 506 or transmission to the content server 240.

While the content is being streamed to the user device 210, the user device 210 may terminate performance of a subtask or prevent execution of a yet-to-be-performed subtask. For example, the user of the user device 210 may indicate via a user interface of the user device 210 that the user device 210 is to terminate the one or more tasks to be performed in exchange for the content. In another example, the user device 210 may determine that the device resource 212 being employed to perform the one or more tasks may not be capable of performing the one or more tasks in a timely manner to justify continuing reception of the content. As a result, the user device 210 may simply not return a message indicating a result of the most recent subtask. As a result, the payment server 250 may determine, in response to not receiving a message indicating the result within a predetermined time period (e.g., timeout 524), that further content portions for streaming to the user device 210 should not be authorized. In some examples, the payment server 250 may transmit a message (not explicitly illustrated in FIG. 5) to the content server 240, and possibly to the user device 210, that the streaming of the content is to be terminated.

Figure 6:
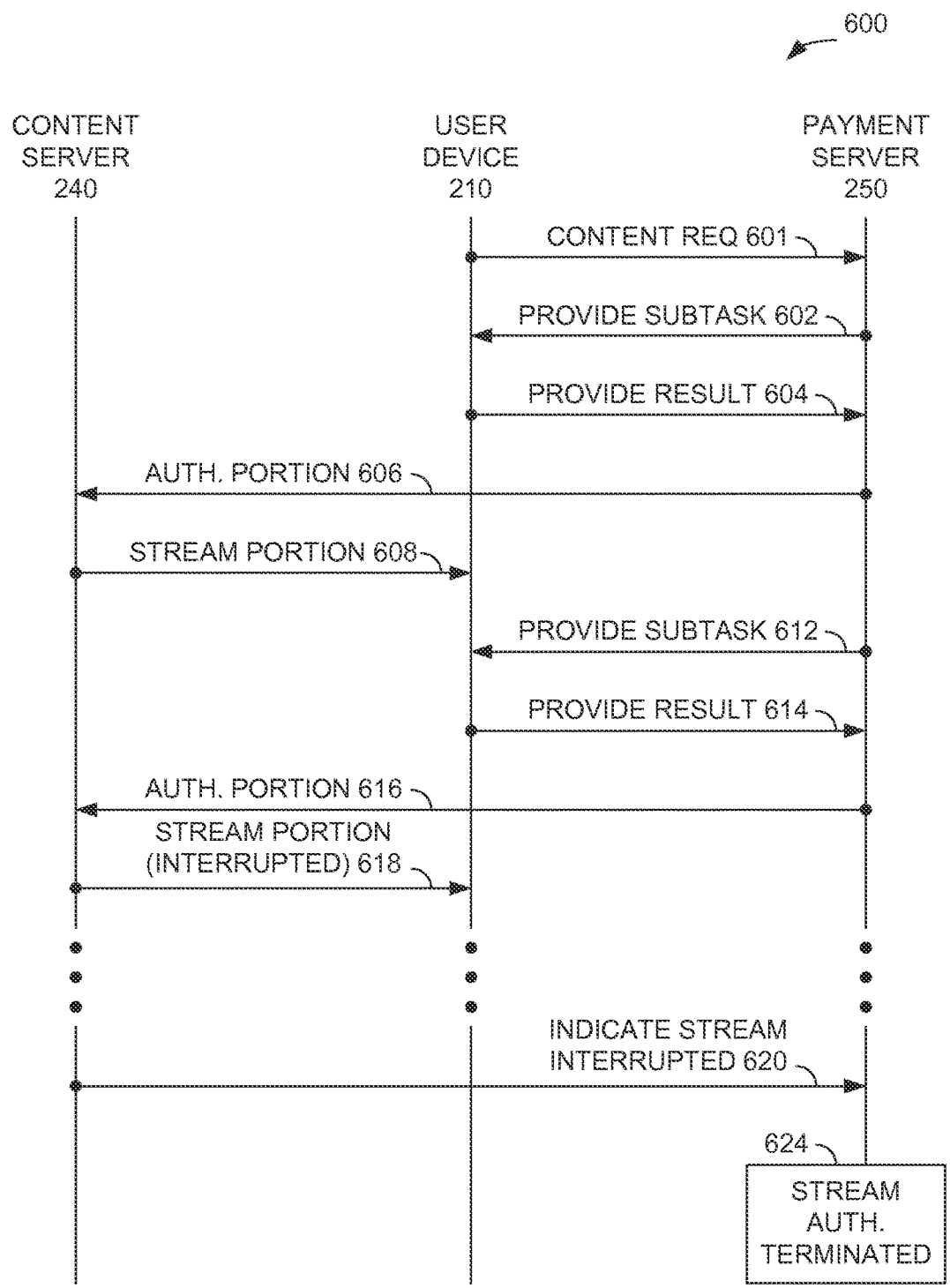
FIG. 6 is a communication diagram of an example in which streaming of content is prematurely terminated at a user device.

FIG. 6 is a communication diagram 600 of an example in which the streaming of content is prematurely terminated at a user device 210. In this particular example, the request for content, the providing of subtasks, the supplying of subtask results, the authorization to stream corresponding content portions, and the streaming of the content portions, as indicated by messages 601 through 616, may proceed as described above concerning messages 501 through 516 of FIG. 5. During streaming of one of the content portions 618, the user device 210 may interrupt reception of the content stream. Such an interruption may be caused, for example, by the user device 210 not acknowledging to the content server 240 reception of the current portion 618 of content being streamed, which may cause the content server to timeout, thus causing the content server 240 to cease further content streaming. In another example, the user device 210 may transmit a message (not specifically depicted in FIG. 6) to the content server 240 or the payment server 250 indicating termination of the streaming of the current content portion 618. In response, the content server 240 may indicate via a message 620 to the payment server 250 that the content stream has been interrupted at the user device 210. In response, the payment server 250 may then terminate further authorizations for streaming subsequent content portions (operation 624).

In at least some of the embodiments described above, one or more tasks may be performed by a user device or by a device associated with that user device) in exchange for content to be streamed to the user device and ultimately presented to the user. In some examples, the one or more tasks to be performed represent a direct payment (e.g., computational mining of a digital currency) for the content to an entity associated with the content, such as a producer, supplier, distributor, assignee, or licensee of the content. In other examples, the one or more tasks may represent use (e.g., a short-term rent) of a computational, communication, or other resource supplied via the user device to the entity associated with the content to perform any task that may be performed via that resource. Further, both the task and the content may be divided into corresponding portions so that the payment for the content, as represented by the performance of the subtasks, may align with the amount of content that has been received, stored, and/or consumed at the user device up to that point. As a result, if the user receiving the content decides that the content is not to the liking of the user, the user may terminate performance of the subtasks during the streaming of the content, thus essentially paying for only the amount of content received up to that point in time.

Figure 7:
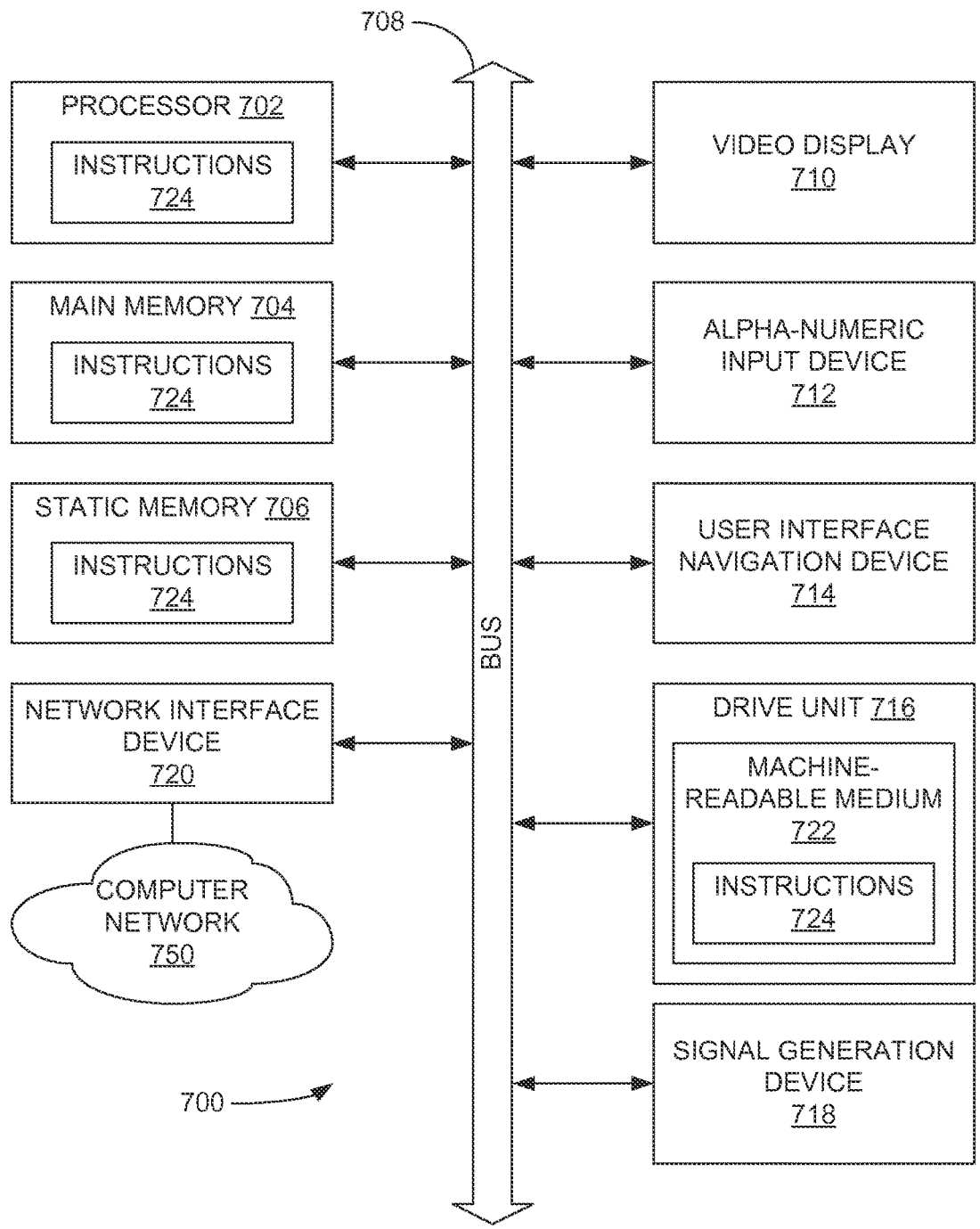
FIG. 7 is a diagrammatic representation of a machine in the example form of a computer system within which a set of instructions may be executed for causing the machine to perform any one or more of the methodologies discussed herein.

FIG. 7 illustrates a diagrammatic representation of a machine in the example form of a computer system 700 within which a set of instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer, a tablet computer, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702, (e.g., a central processing unit (CPU), a graphics processing unit (GPU) or both), a main memory 704 and a static memory 706 which communicate with each other via a bus 708. The computer system 700 may further include a video display 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722, on which is stored one or more sets of instructions and data structures (e.g., instructions 724) embodying or utilized by any one or more of the methodologies or functions described herein. The instructions 724 may also reside, completely or at least partially, within the static memory 706, within the main memory 704, and/or within the processor 702 during execution thereof by the computer system 700, the main memory 704 and the processor 702 also constituting machine-readable media.

The instructions 724 may further be transmitted or received over a computer network 750 via the network interface device 720 utilizing any one of a number of well-known transfer protocols (e.g., HyperText Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions 724. The term "machine-readable medium" shall also be taken to include any medium that is capable of storing, encoding or carrying a set of instructions 724 for execution by the machine and that cause the machine to perform any one or more of the methodologies of the present inventive subject matter, or that is capable of storing, encoding or carrying data structures utilized by or associated with such a set of instructions 724. The term "machine-readable medium" shall accordingly be taken to include, but not be limited to, solid-state memories, and optical and magnetic media.

Throughout this specification, plural instances may implement components, operations, or structures described as a single instance. Although individual operations of one or more methods are illustrated and described as separate operations, one or more of the individual operations may be performed concurrently, and the operations may be performed in an order other than that illustrated. Structures and functionality presented as separate components in example configurations may be implemented as a combined structure or component. Similarly, structures and functionality presented as a single component may be implemented as separate components. These and other variations, modifications, additions, and improvements all within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor, it will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, mathematic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments include more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving, by at least one hardware processor and from a user device and via a network, a request for a content item, the request including an indicator of a type of task to be performed by the user device in addition to presenting the content item;
   providing, in response to the request, via the network and using the at least one hardware processor, a task to be executed during streaming of the content item to the user device, wherein the task is of the type of task indicated in the request and is to be executed using at least one device resource associated with the user device; and
   causing the streaming of the content item to the user device to terminate in response to a determination that the execution of the task using the at least one device resource has been terminated.

2. The method of claim 1, further comprising:
   causing the execution of the task to terminate in response to a determination that the presentation of the content item has been terminated.

3. The method of claim 1, wherein:
   the streaming of the content item comprises streaming each of a plurality of portions of the content item in succession to the user device; and
   the providing of the task comprises providing a plurality of subtasks, wherein each of the plurality of subtasks is to be performed during a corresponding one of the plurality of portions of the content item.

4. The method of claim 3, wherein a portion of the plurality of portions of the content item is streamed in response to receiving an indication that performance of a subtask of the plurality of subtasks corresponding to the portion of the plurality of portions of the content item was completed.

5. The method of claim 4, wherein the indication that the performance of the subtask of the plurality of subtasks corresponding to the portion of the plurality of portions of the content item was completed comprises a result of the performance of the subtask.

6. The method of claim 3, further comprising:
   dividing the task into the plurality of subtasks; and
   dividing the content item in the plurality of portions, where each of the plurality of portions corresponds to one of the plurality of subtasks.

7. The method of claim 1, wherein the user device comprises the at least one device resource.

8. The method of claim 1, wherein:
   the user device comprises a first user device; and
   another user device communicatively coupled with the first user device comprises the at least one device resource.

9. The method of claim 1, wherein:
   the user device comprises a first user device;
   the at least one device resource comprises a plurality of device resources; and
   each of a plurality of other user devices communicatively coupled with the first user device comprises at least one of the plurality of device resources.

10. The method of claim 1, wherein the at least one device resource comprises a computational unit.

11. The method of claim 1, wherein the at least one device resource comprises a communication unit.

12. The method of claim 1, wherein the task comprises computationally mining a digital currency.

13. The method of claim 1, wherein the task comprises performing computations for a facial recognition algorithm.

14. The method of claim 1, wherein the task comprises performing computations for a deoxyribonucleic acid (DNA) folding algorithm.

15. The method of claim 1, wherein the task comprises retransmitting communication data to a plurality of communication devices other than the user device.

16. The method of claim 1, wherein the content item comprises one of an audio content item, a video content item, an audio/video content item, a still image, and a textual content item.

17. A system, comprising:
   at least one hardware processor; and
   memory including instructions that, when executed by the at least one hardware processor, cause the system to perform operations comprising:
      receiving, by at least one hardware processor and from a user device and via a network, a request for a content item, the request including an indicator of a type of task to be performed by the user device in addition to presenting the content item;

providing, in response to the request and via the network, a task to be executed during streaming of the content item to the user device, wherein the task is of the type of task indicated in the request and is to be executed using at least one device resource associated with the user device; and causing the streaming of the content item to the user device to terminate in response to a determination that the execution of the task using the at least one device resource has been terminated.

18. The system of claim 17, wherein the system comprises one of a media gateway, a television set-top box, a gaming system, a desktop computer, a laptop computer, a tablet computer, a smart phone, and a personal digital assistant.

19. A non-transitory computer-readable storage medium comprising instructions that, when executed by at least one processor of a machine, cause the machine to perform operations comprising:

receiving, by at least one hardware processor and from a user device and via a network, a request for a content item, the request including an indicator of a type of task to be performed by the user device in addition to presenting the content item;

providing, in response to the request and via the network, a task to be executed during streaming of the content item to the user device wherein the task is of the type of task indicated in the request and is to be executed using at least one device resource associated with the user device; and causing the streaming of the content item to the user device to terminate in response to a determination that the execution of the task using the at least one device resource has been terminated.

* * * * *